(12) United States Patent
Hodge (10) Patent No.: US 6,672,641 B2
(45) Date of Patent: Jan. 6, 2004

(54) TOOL BOX

(76) Inventor: William O. Hodge, P.O. Box 191536, Mobile, AL (US) 36619

( * ) Notice: Subject to any disclaimer, the term of this patent is extended or adjusted under 35 U.S.C. 154(b) by 0 days.

(21) Appl. No.: 10/186,495

(22) Filed: Jun. 28, 2002

(65) Prior Publication Data

US 2002/0163217 A1 Nov. 7, 2002

Related U.S. Application Data

(63) Continuation of application No. 09/634,276, filed on Aug. 9, 2000, now abandoned.
(60) Provisional application No. 60/148,390, filed on Aug. 11, 1999.

(51) Int. Cl.[7] .............................. B60R 9/00; B60R 9/06; E06C 5/00
(52) U.S. Cl. ................................ 296/37.6; 296/100.06; 224/404; 182/127
(58) Field of Search .............................. 296/37.6, 37.5, 296/100.06, 100.07, 37.1, 76, 183; 224/402, 403, 404; 182/127

(56) References Cited

U.S. PATENT DOCUMENTS

| | | | | |
|---|---|---|---|---|
| 1,826,893 A | * | 10/1931 | Larsen | 248/201 |
| 3,012,814 A | * | 12/1961 | Penner | 296/100.06 |
| 3,800,959 A | * | 4/1974 | Finocchiaro et al. | 211/89 |
| 3,889,817 A | * | 6/1975 | Berkman | 211/163 |
| 4,288,011 A | * | 9/1981 | Grossman | 224/42.42 |
| 4,580,827 A | * | 4/1986 | Feagan | 296/37.6 |
| 4,750,773 A | * | 6/1988 | Chapline et al. | 296/37.6 |
| 5,088,636 A | * | 2/1992 | Barajas | 224/281 |
| 5,169,200 A | * | 12/1992 | Pugh | 296/37.6 |
| 5,201,561 A | * | 4/1993 | Brown | 296/37.6 |
| 5,482,342 A | * | 1/1996 | Kowalski et al. | 294/160 |
| 5,819,873 A | * | 10/1998 | Higgins | 182/129 |
| 5,826,719 A | * | 10/1998 | Chen | 206/373 |
| 5,881,892 A | * | 3/1999 | Loo | 211/133.3 |
| 6,189,945 B1 | * | 2/2001 | Rockett | 296/37.6 |
| 6,264,030 B1 | * | 7/2001 | Tsou | 206/372 |
| 6,302,465 B1 | * | 10/2001 | Faber et al. | 296/39.1 |
| 6,375,054 B1 | * | 4/2002 | Lance et al. | 224/404 |

FOREIGN PATENT DOCUMENTS

| | | | | |
|---|---|---|---|---|
| JP | 2-124337 | * | 5/1990 | 296/98 |

* cited by examiner

*Primary Examiner*—Stephen T. Gordon
*Assistant Examiner*—Hilary Gutman (57) ABSTRACT

A tool box is shown for use with a vehicle having a bed having a length and a width. The vehicle has a back wall having a top, a left side wall having a top and a right side wall having a top. The vehicle has a tailgate. The tool box has a top plate having a wall end and an extended end. The top plate is rotatably attached to the top of the back wall at the wall end. The top plate has a width at least approximately equal to the width of the bed and a front plate runs between the left side wall and the right side wall. The front plate has a bed end and a raised end. The front plate is rotatably attached by pivots at the bed end to the bed of the vehicle at a given location between the tailgate and the back wall. The raised end can be connected to the extended end to form a tool box which may be folded out of place when not in use.

6 Claims, 11 Drawing Sheets

TOOL BOX

This patent is a continuation of Provisional Patents: 60/148,390 filed Aug. 11, 1999 and U.S. patent application Ser. No. 09/634,276 filed Aug. 9, 2000 (now abandoned).

BACKGROUND OF INVENTION

1. Field of Invention

The present inventions relate to tool boxes and more particularly tool boxes which go onto the bed of trucks. The invention also relates to rack systems for holding tools used in conjunction with toolboxes.

2. Prior Art

Tool boxes are well known in the prior art. In addition, tool boxes which fit on the back of vehicles are well known. Also vehicle covers which do not function as tool boxes but cover the beds of vehicles are known in the prior art.

GENERAL DISCUSSION OF THE INVENTION

Toolbox

This invention pertains to truck tool boxes. Truck tool boxes are well known in the art and typically comprise a box which is attached to the back of a pick up truck and to the left and right sidewalls of a pick up truck. One of the problems with prior art tool boxes is that they often must be removed and then reattached later for several reasons. Some of the reasons that tool boxes are moved include adding longer products within the truck bed or to protect the tools from theft. Because the box itself often weighs as much as the tools, this is a difficult task. The tool box cannot be made of light material because it has to be able to withstand potential theft activity. The present tool box utilizes the side walls, back wall and truck bed as four walls so that only two added walls are necessary. The tool box walls are designed to by easily removed leaving the tools in place.

Other systems include roll out covers which cover the entire truck bed. While these systems serve to protect the entire bed, they are not efficient in keeping tools to a restricted area while the rest of the truck bed is accessible. These may, however be adapted to work with the described invention as is described in more detail herein.

Tape measures are known in the art. These tape measures may extend from a container and be retractable by a spring. The present invention is designed to improve on this technology by adding holes or grooves for making marks at predetermined locations in a spring loaded tape measure.

A tape measure defining holes along a periodic spacing is defined by the set spacing for the use intended as described. One example of this is 19" spacing for the spars of a typical boat drum and another is 16" spacing for two by fours in standard building frames.

By placing holes along these periodic positions, for example on the building frame at 16", 32", 96", etcetera, and by having these holes large enough for a pencil point or other marking instrument to fit, it is possible to mark a distance from the studs by sticking a pencil within the holes and moving the entire tape measure up and down. The curvature at the distances is sufficiently small so as not to effect the accuracy of the mark and it allows for an accelerated marking in order to drive nails in order to secure sheet rock to frame members and the like.

Another improvement would be to have a tape measure with a writing means built into it or a scoring means built into it at those predetermined distances so that once the tape measure was extended along the wall, the entire tape measure could be pushed against the wall and slid up and down and the markings would be left at the appropriate locations.

One tape measure could be used for both the 16 and 19 inch measurements. Another improvement would be to have one set of holes at a low height and the other set at a high height along the tape measure or conversely to have the holes at different shapes or different color charting or both in order to allow one set of markings to be distinguished from another.

The carry cart is a cart designed to hold tools at various locations and particularly to hold bins and loose tools from the tool box described herein. It is provided with a frame on wheels which may be retracted when it is in the desired location. It has a wire rack which is supported on the frame from which tools may be hung. To hold larger tools, brackets are provided which may be moved to different heights. These brackets may receive the bins or trays from the tool box to hold tools or parts in easily handled parcels. In the present invention it is specifically designed to receive tool bins utilized in conjunction with the tool box described herein as set out in more detail below.

It is therefore an object of the invention to allow tools to be held in a light weight, easily removable holder while providing the protection of an all metal tool box.

It is also a purpose of the invention to provide a tool box which folds up so that it takes up less room when the there are no tools present.

It is also an object of this invention to provide a tool box which can easily be removed even if the tools are left in place.

It is a further object of the invention to provide for a tool box which need not be completely removed in order to be out of the way of a larger product.

It is a further object of the invention to provide a method for transporting heavy tool bins to and from a tool box with minimal effort.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIG. 16 is a rear view of FIG. 1.

DETAILED DESCRIPTION OF THE PREFERRED EXEMPLARY EMBODIMENTS

Figure 1:
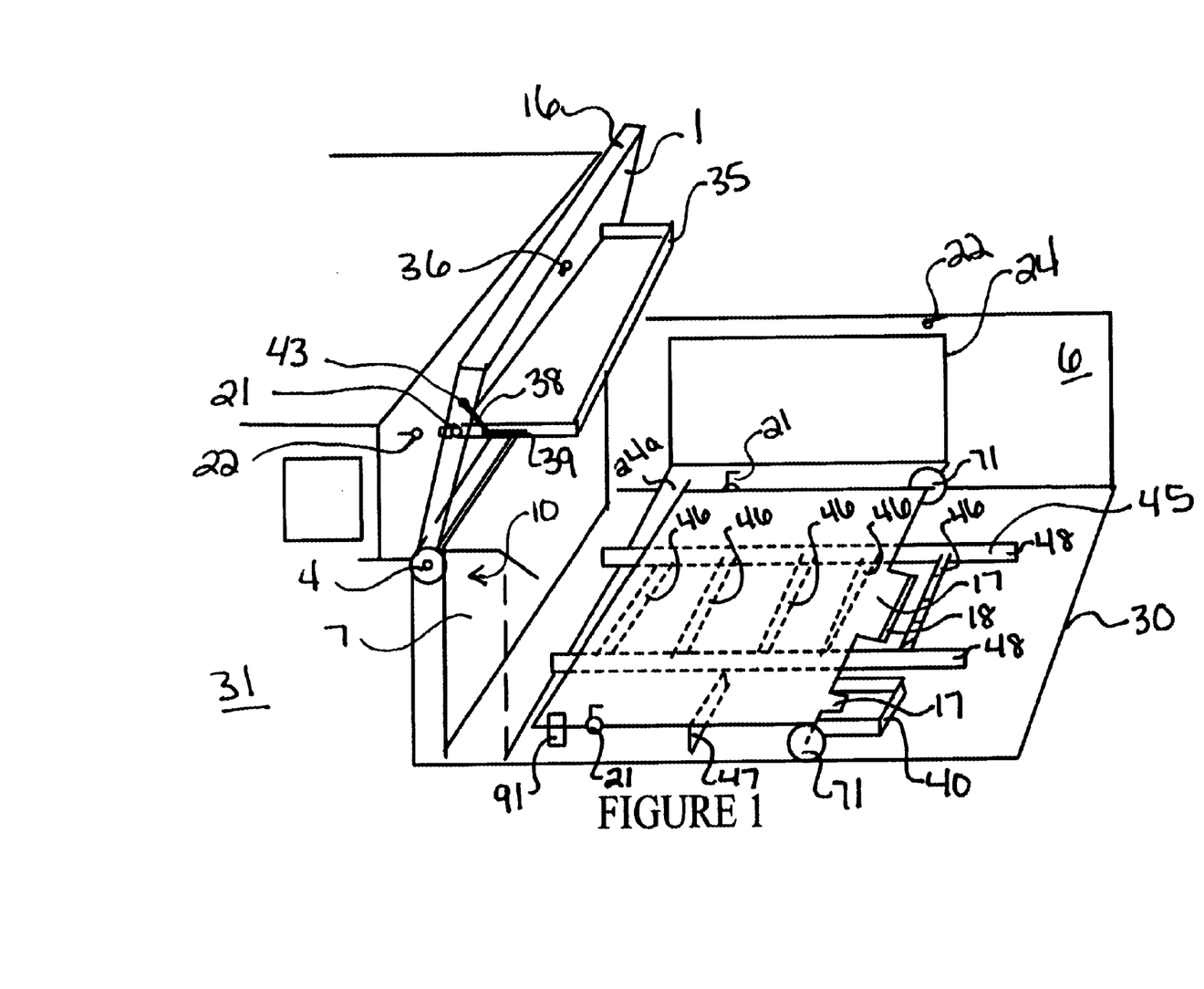
FIG. 1 shows the preferred embodiment of the invention in perspective view through a partially cut away left side wall.
Figure 6:
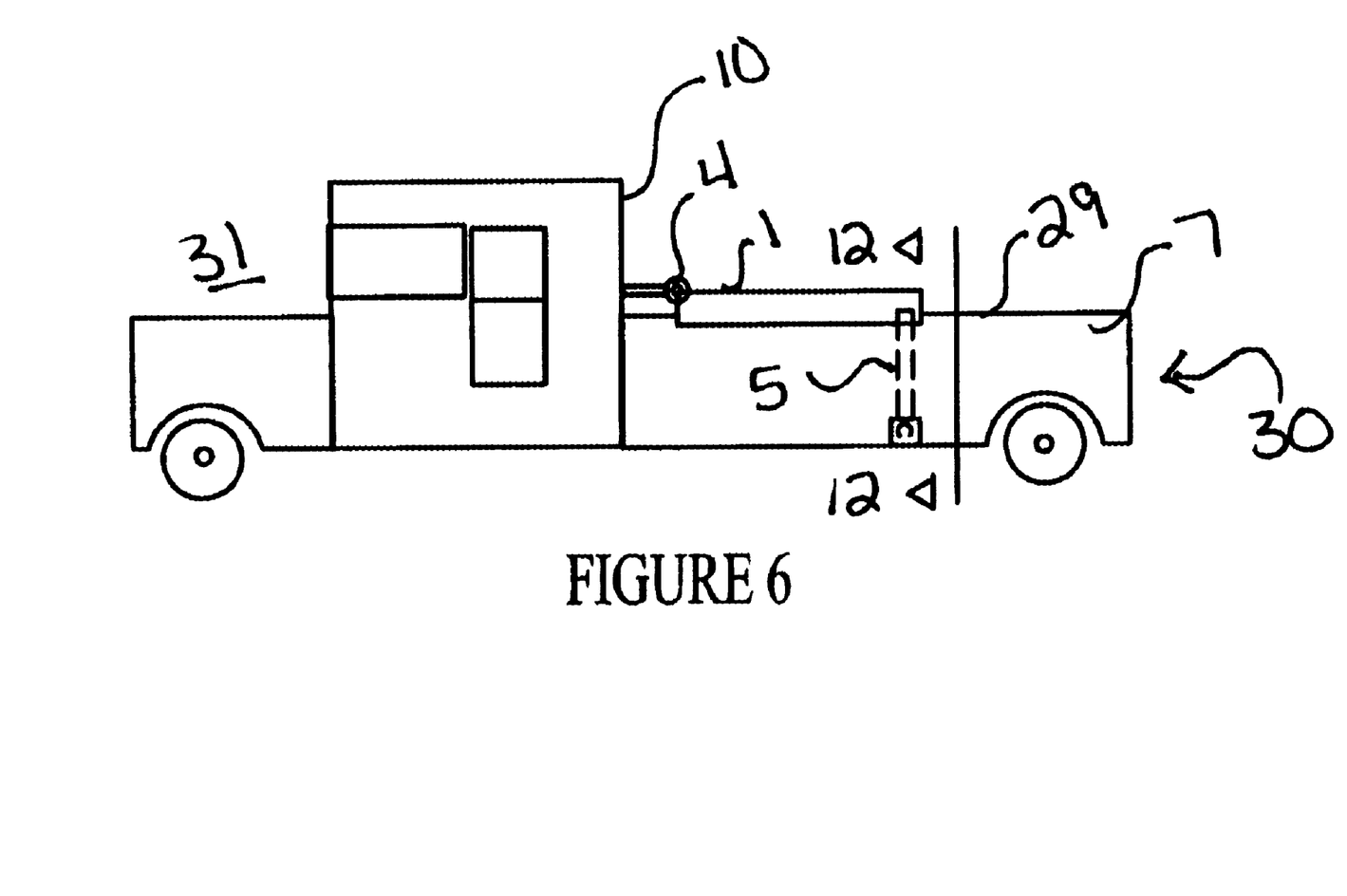
FIG. 6 shows a truck with a closed tool box.

As can best be seen by reference to FIG. 1 and FIG. 6, a typical truck comprises a truck back 10 at the back of the cab 31 of the truck, a left sidewall 7 (shown in FIG. 1) and a right sidewall 6 as well as a truck bed 8 (one side wall is shown partially cut away to expose more of the parts).

The present invention preferred embodiment is a folding truck tool box comprised of a top plate 1 which swivels upward on first swivel 4. Top plate 1 is attached above the truck bed 8 to the truck back 10.

The left sidewall 7 and right sidewall 6 of the truck may provide sides for the tool box described herein. Side plates 24 may be attached against the left sidewall 7 and against the right sidewall 6 to make the sides of the tool box. A side plate is present in the preferred embodiment. The 'front' of the tool box faces the tailgate 9 at the rear of the truck and is defined by the front plate 5. The rear of the tool box may be the truck back 10, although an insert may be put in place here also.

A separate method of crating a bottom for the tool box is described in reference to FIGS. 1, 11, and 12 below.

The floor 24a, here attached to the side plates 24, may be elevated off the truck bed 8 on feet 91 so that water drains under the floor 24a. The elevation may be accomplished by elevating the pivots 71 above the truck bed 8 and by having the floor 24a supported on feet 91.

The front plate 5 pivots upward from the truck bed 8 on back pivots 71 which are attached on either side to the sidewalls 6 and 7. As shown in FIG. 1, one or more extension plates 17, which may have a flexible extension pad 18, may close off the bottom of the front plate 5 as the front plate pivots upward, moving these extension plates 17 between the pivots 71 to press against the truck bed 8 to provide a seal to the bottom of the truck bed 8.

The pivots 71, hold the plate 5 above the bed 8 sufficiently so that there is room under the plate 5 for a ladder 45 or at least one bin 40 (a drawer) as shown in this embodiment. As can be seen in FIG. 1, the bin 40 is held shut by the extension plate 17 when the front plate 5 is locked in the raised position as described in more detail in the description below. The bin 40 is prevented from moving too far towards the back wall 10 of the truck by a drawer stop 47.

While the front plate 5 is seen here as lowered towards the truck cab 31, it may be designed to fold in either direction.

A drawer 35 folds down from the top plate 1 so that when the drawer 35 is folded up, it is sealed against the top plate 1. The drawer 35 is held on a support arm 38 which is attached to the top plate 1 by a support arm pivot 43 and attached to a slot 39 in the drawer 35 by a support arm pivot pin 41. The top plate drawer 35 may be held by more than one support arm 38. The drawer 35 may also have a light 36 in place on the top plate 1 in order to illuminate drawer 35 as well as to illuminate the inside of the toolbox when the drawer 35 is down.

When the top 1 is raised, the front wall 5 may be held in place by a pin 21 swiveling on the front plate 5 and a loop 22 attached to either sidewall 6 and 7 for receiving the pin 21. Similarly, the top plate 1 may be held against the cab 31 by a pin 21 through a loop 22 as a joining means for this purpose. While pins and loops are shown, it is obvious that other joining means such as pneumatic arms, (VELCRO type hook and loop fastening strips, rope tows and the like) may be used to hold these parts out of the way and in place.

The top plate drawer 35 could be accessed when the top plate 1 is partially raised.

There is a joining means so that the top plate 1 and the front plate 5 are connected. As can best be seen by reference to FIG. 2 (a perspective view) and FIG. 3 (a cross section of FIG. 2), one method of accomplishing this while allowing the parts to be locked together would be to have the top plate 1 folded down, an insertion plate 16 at the end of and at an angle of approximately 90 degrees to the top plate 1 fits within a slot 11 defined in a securing plate 15 which is attached at an angle of approximately 90 degrees to the front plate 5. A protection plate 13 makes it difficult to cut the lock arm 20 of the lock 19 which can fit into a hole 26 in the insertion plate 16 to hold the top plate 1 down.

The top plate 1 may slant slightly towards the rear 30 of the truck bed 8 so that water does not collect on top, but instead drains to the back of the truck.

Figures 2, 3, 3A:
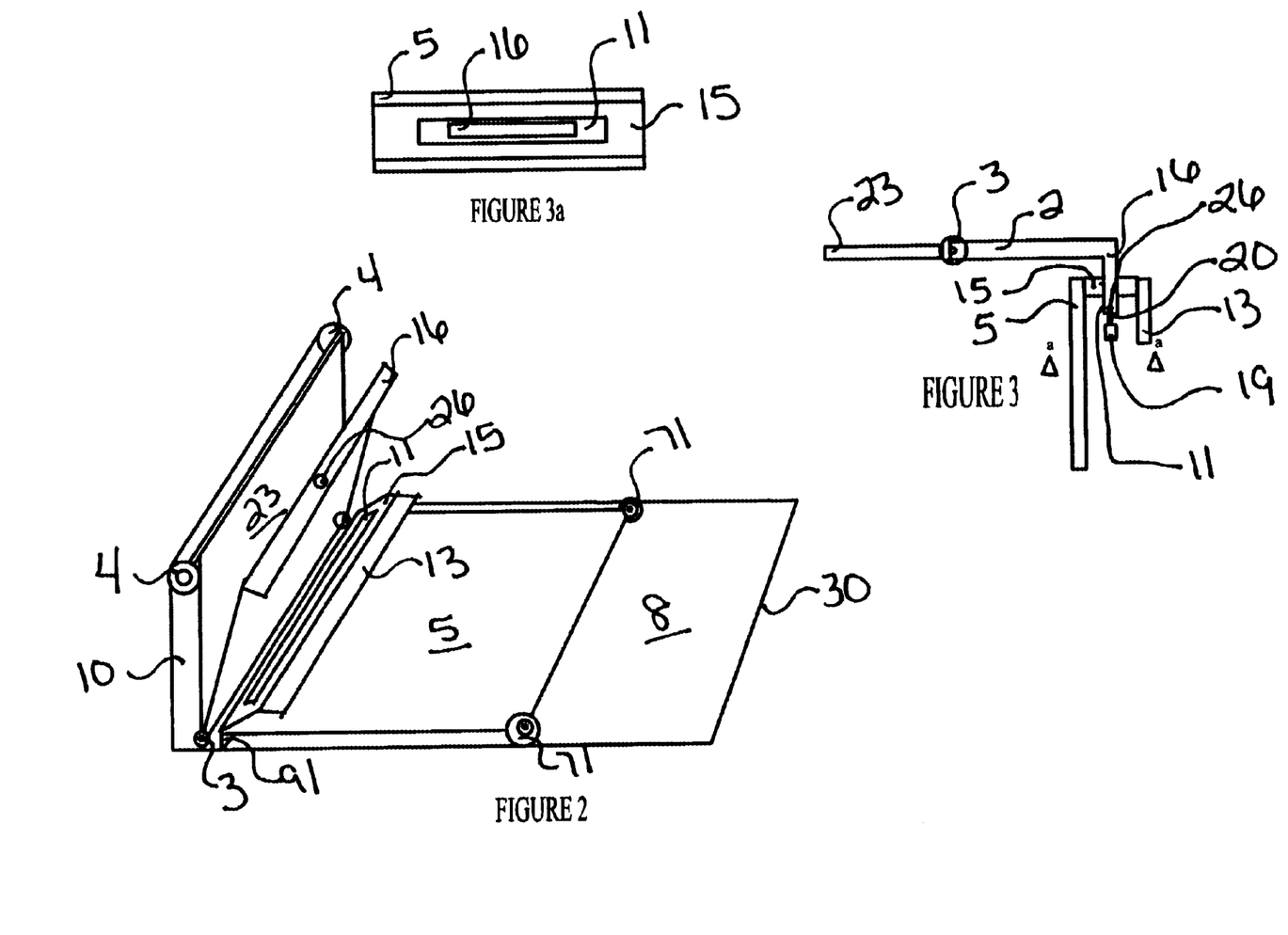
FIG. 2 shows an alternate embodiment having an extendable top.
FIG. 3 shows a cross sectional alternative view of the drawing of FIG. 2 showing the attachment of the top plate to the front plate 5 when it is closed.

To allow for a longer tool bed or to better fold the top plate 1, one or more second swivels 3 may be in place to separate the top plate 1 into one or more attaching plates 23 followed by the swivel 3 and a top extension plate 2 as shown in FIG. 2.

Figures 4, 5:
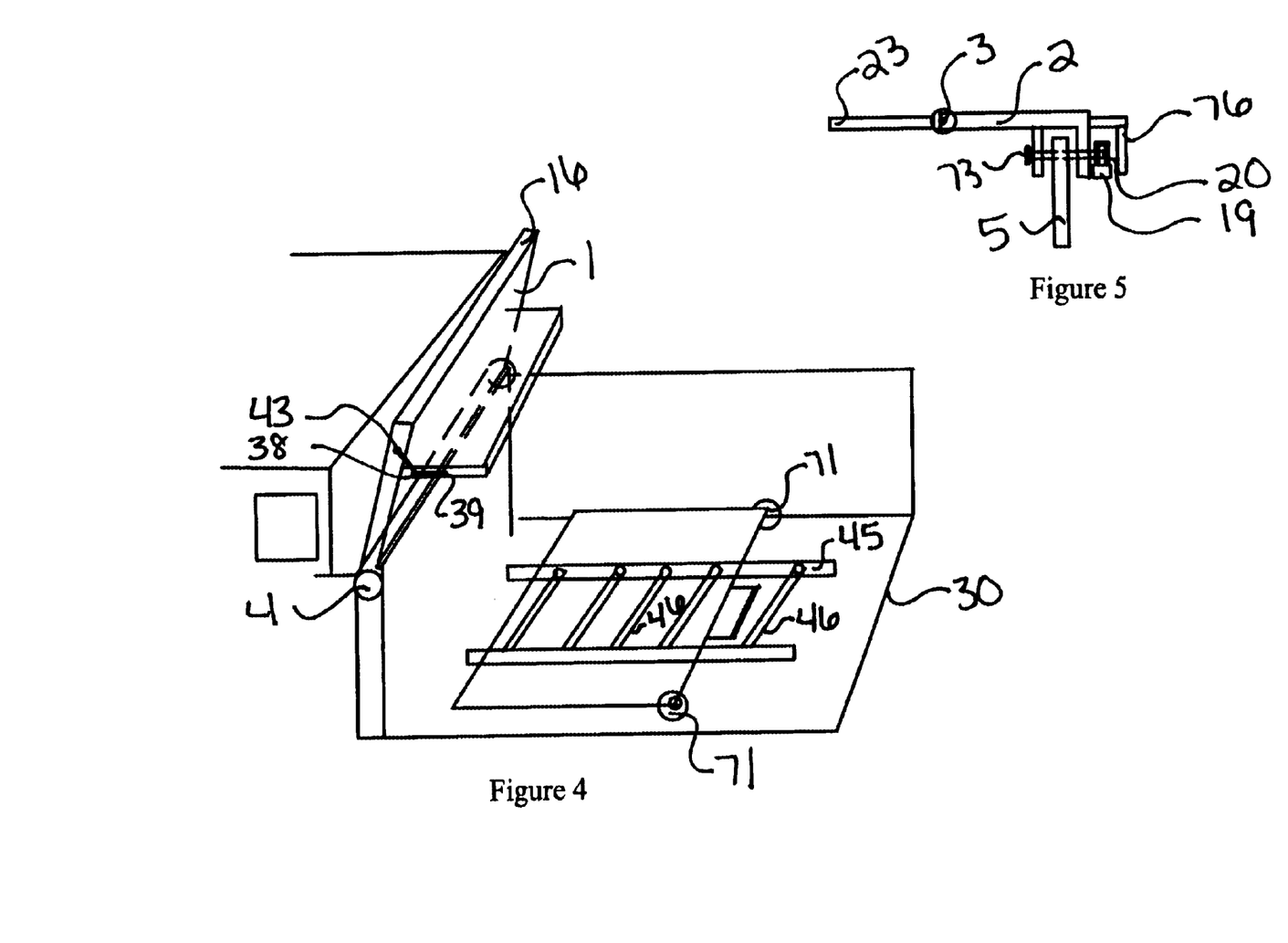
FIG. 4 shows an alternate embodiment of FIG. 2.
FIG. 5 shows a cross section of FIG. 4 when closed.

FIGS. 4 and 5 show alternative mechanisms in similar perspective and cross section for protecting the lock 19 where the top plate 1 defines the slot between two plates. Rod 73 may pass through the front plate 5 and receive lock 19. In this way, the lock must be removed and rod 73 pushed back to open or close the bed. First plate 76 shields the lock 19.

The back pivots 71 may be designed so that the bottom of the front plate 5 contacts, approximately, the truck bed 8 when the front plate 5 is raised to lock the tool box.

While in FIGS. 2–4 top extension plate 2 is only shown for the top plate 1, the top plate 1 or front plate 5 may fold up or roll out so long as the tool box is formed between them.

Figure 12:
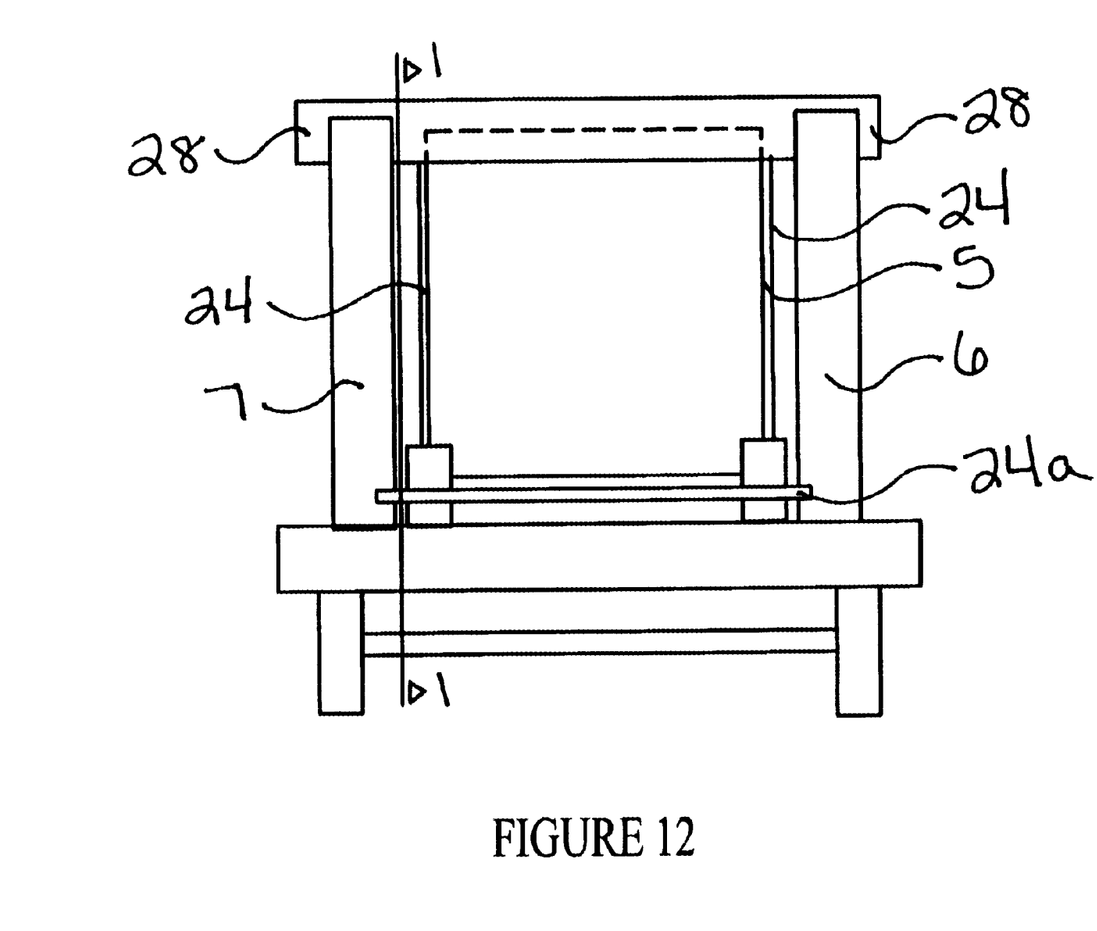
FIG. 12 shows a rear view through the line 12—12 axis of FIG. 6.

The top plate 1 may have overhangs 28 as shown in FIGS. 6 and 12 which extend over the sidewalls 6 and 7 if the top plate 1 is lowered onto the sidewalls 6 and 7 to keep water out of the tool box. Here, the overhangs 28 rotate outward along hinges 1c from the top plate 1 to extend over the left and right sidewalls.

The top plate 1 may fold into two parts in order to have greater extension in which case it would have an attaching plate 23 of a top extension plate 2. The top extension plate 2 may swivel off of attaching plate 23 as shown in FIG. 2 or it may slide off of the top or from the middle of the attaching plate 23 through rails or it may roll out depending on the needs.

While a single location for the front plate 5 is shown, it may be placed at various positions to the extent that the length of the top plate 1 may be changed by the methods disclosed or other similar methods.

All of the pivots may be removable from the top plate and front plate so that the top plate and back can be removed.

Since the primary purpose of the invention is to alleviate the need for a fixed tool box and allow easy movement of tools, FIGS. 13, 11, 9 and 10 show how the device may be utilized to further ease the workload of a user.

Figure 13:
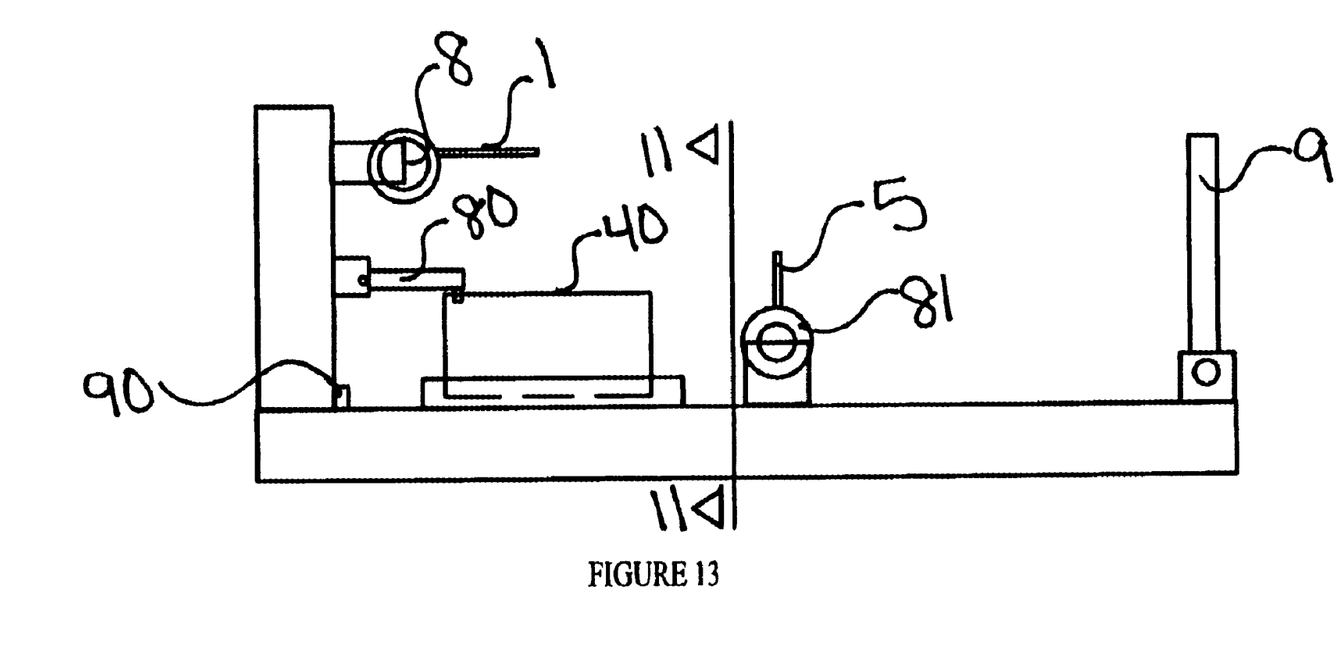
FIG. 13 shows a side view of an alternate embodiment with the side walls removed.

As can be seen by reference to FIG. 13, the top plate 1 and front plate 5 have been replaced with reels of material which slide in rails or are otherwise maintained in place to create an enclosure of desired strength.

The bottom of the tool box is lifted from the surface of the bed 8 of the truck so that water will not affect the tools. One or more bins 40 (two are shown in FIG. 11) may be inserted between raised rails 42a to secure these bins 40 in place. Rocking pins 80 may hold the bins 40 at the back wall 10 of the truck. Other securing methods may be substituted for the rocking pins 80. The bins 40 have top curving sides 50 which are useful to lift the bins and to hold the bins on racks. The bins 40 have top curving sides 50 which are useful to lift the bins and to hold the pins on racks.

Figures 9, 10:
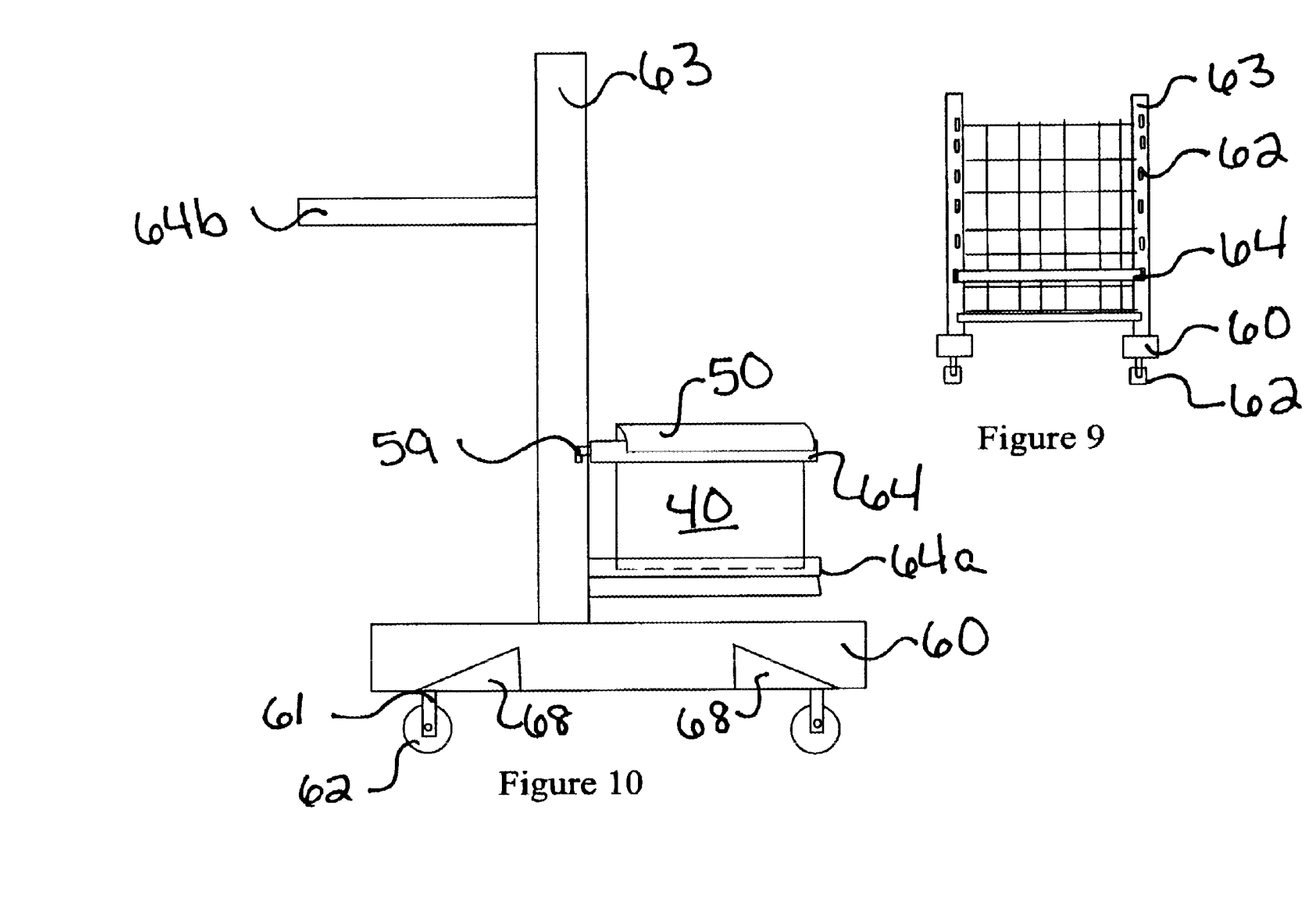
FIG. 9 shows the carry cart described herein.
FIG. 10 shows a side view of the carry cart shown in FIG. 9.

Historically, several trips to the vehicle are necessary to use tools. To alleviate this need, towers 63 are provided as shown in FIGS. 9 & 10 which can hold tools on wire racks 70 and which towers 63 can hold the bins 40 by way of bin arms 64 over which the curving sides 50 fit.

The carry cart consists of two bases 60 from which extend two wheels 62 on the front and back of each base 60 which are mounted on wheel legs 61. The wheels 62 and wheel legs 61 may be retractable into a wheel well 68 so that the carry cart may rest on the bottom of the base 60 with the wheels retracted when in the desired location. From each base 60 a tower 63 extends upward. The two towers 63 are joined by a wire rack 70 which has horizontal and vertical wires in order to form a grid on which tools may be hung.

The towers 63 define key openings 32 into which brace locking keys 59 may fit to hold bin arms 64. The tower 63 approximately centered on the base 60 so that the rack is more stable when loaded with tools. Also, the bin arms 64 may be on either side of the rack 70 to add stability.

The bins 40 may fit within the arms 64 which extend outward to hold larger items in place and also to give a hand hold for pulling the carrying cart around. At the bottom of at least one bin 40 may be a drawer 64a to support the bottom of the bin 40 or catch things which drop from the bin or to hold small items not held within the bins.

The light 36 may be powered by the truck and may be replaced or replaceable with a power strip for running tools or recharging tools held within bins within the rack system or the drawer 35.

Figure 11:
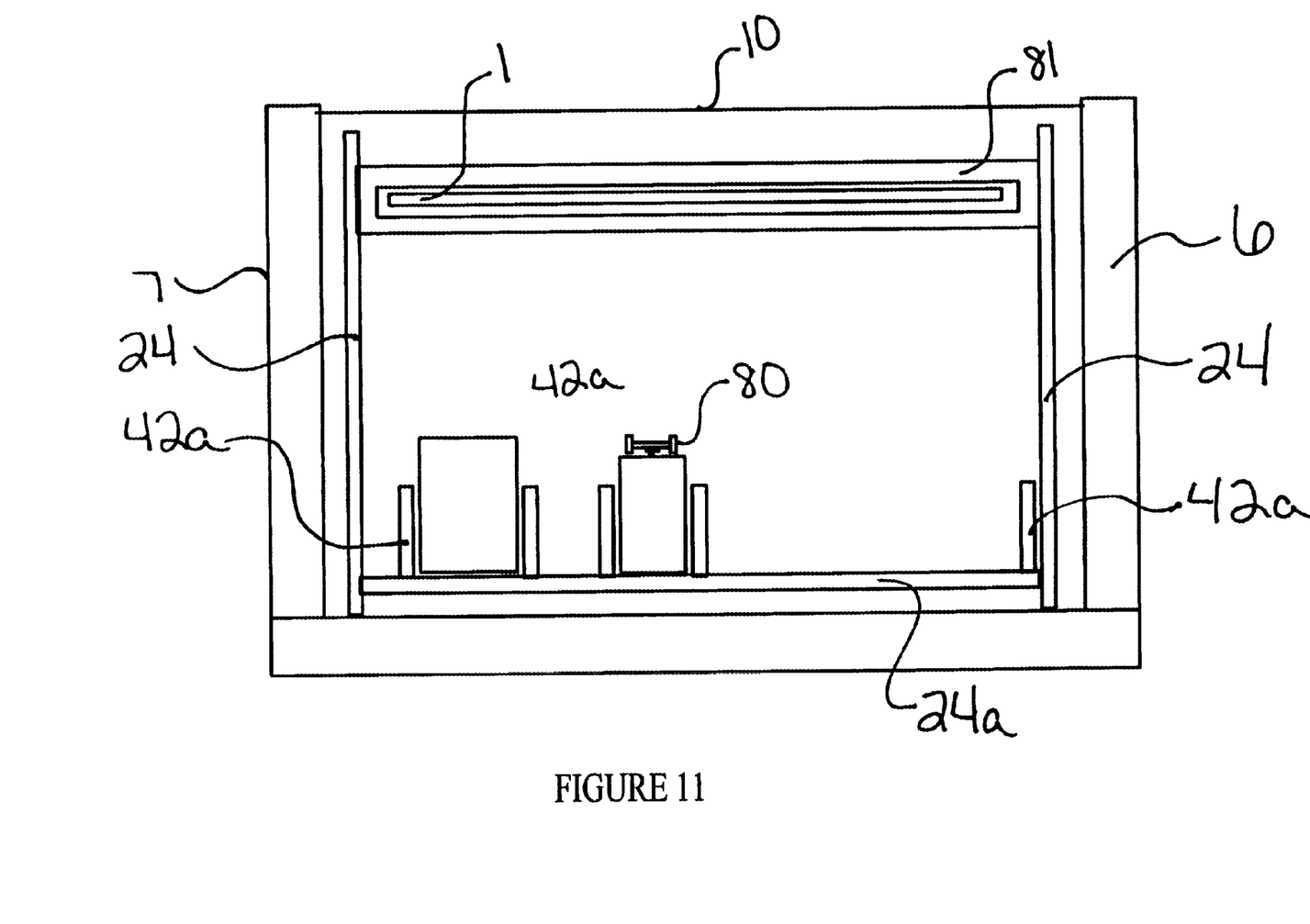
FIG. 11 shows a rear view through line 11—11 of FIG. 13 with baskets added.

As can be seen by reference to FIGS. 13 and 11, the top plate 1 and front plate 5 may be replaced with roll out walls on spindles 81. The view of FIG. 11 does not show the bottom spindle holding the front plate 5.

A magnetic trapping strip 90 (shown by way of example in FIG. 13) may be provided at the bottom of the back wall 10 or elsewhere within the rack to pick up loose bolts and nails and other metal objects. Similarly, a magnetic holding strip may be put in place along the side plates 24 to catch nails or to hold metal tools. This magnetic strip 90 would preferably be a removable magnetic strip 90 for retaining loose metal fittings so that it could be lifted out to collect the loose magnetic pieces attached to it.

A power strip may be substituted for light 36 or may be placed at a different, more convenient location and may be provided so that it is available when the top plate is lowered or when it is raised or from either direction. In order to provide power a wire may be run from the light or power source to the battery in the vehicle. The top 29 of the truck left sidewall 7 is shown in FIG. 6.

Figure 14:
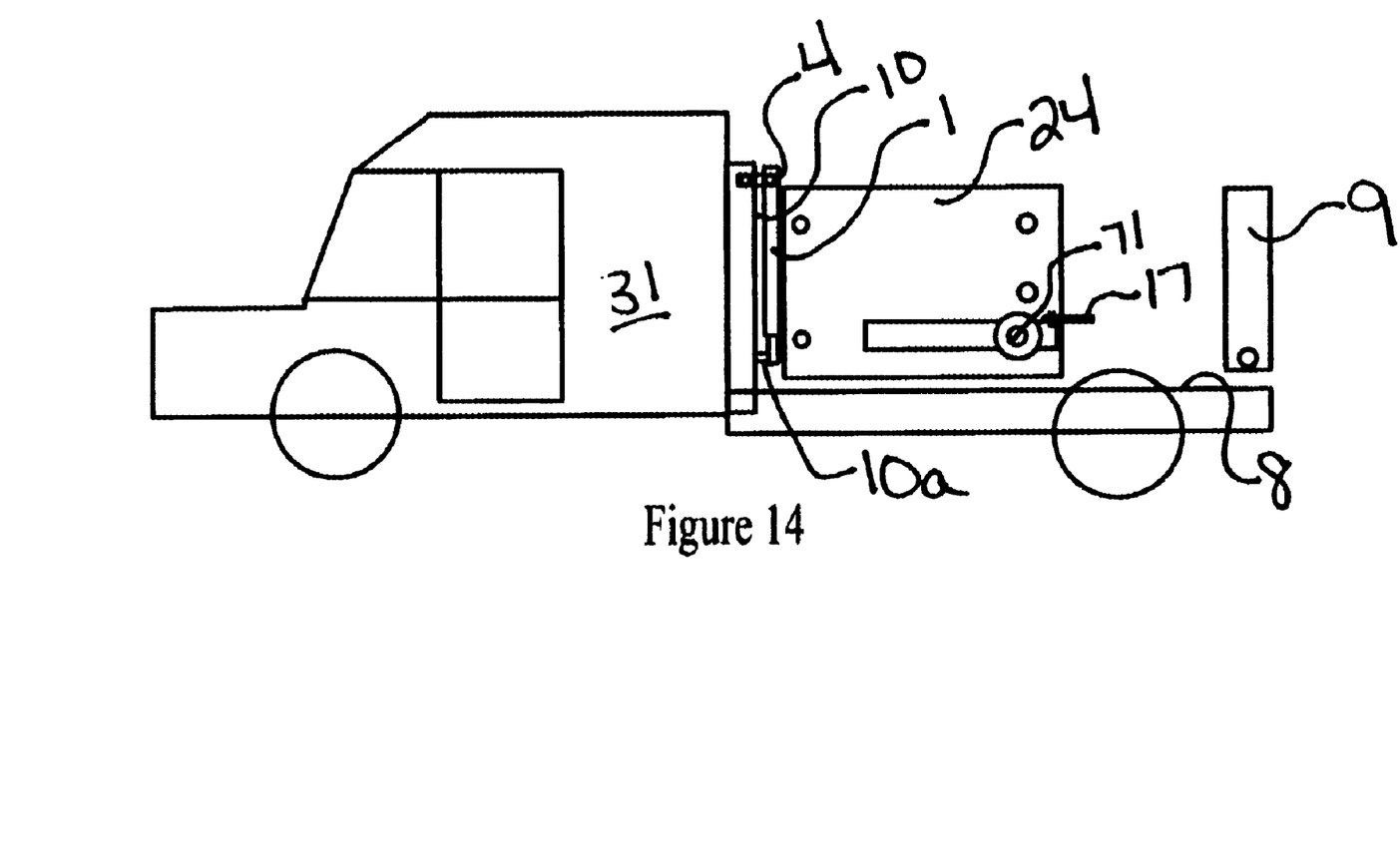
FIG. 14 shows a side view of the insertable tool box in the open position.

FIG. 14 shows a side view of the insertable tool box in the open position. This shows the first swivel 4 extended away from the back wall 10 of the truck so that the top may open without interfering with the truck back 10. A stop 10a prevents the toolbox top plate 1 from banging against the back wall 10.

Figure 15:
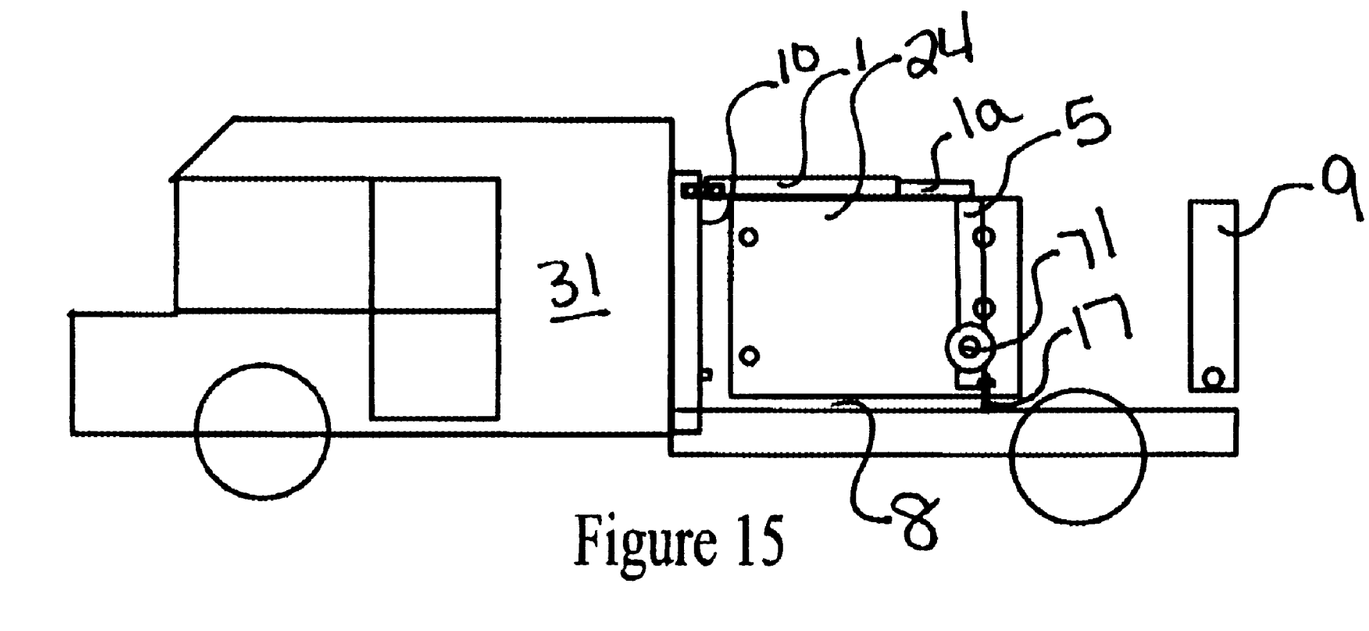
FIG. 15 shows the tool box of FIG. 14 with the tool box closed.

FIG. 15 shows the tool box of FIG. 14 with the tool box closed. There is an extendable section 1a of the top plate 1 in order allow for the top plate 1 to extend further over the tool box and still let down out of the way. This section 1a would extend out of the top plate 1 in the preferred embodiment.

Tape Measure

A tape measure is disclosed defining holes along a periodic spacing defined by the set spacing for the use intended. Examples are 19" spacing for spars of standard boats and 16" spacing for two by fours in standard building frames.

Holes are placed along these periodic positions. For example, on the building frame at 16", 32", 96", etcetera. By having these holes large enough for a pencil point or other marking instrument to fit, it is possible to mark a distance from the studs by sticking a pencil in the hole and moving the entire tape measure up and down. The curvature at these distances is sufficiently small so as not to effect the accuracy of the mark and it allows for marking to drive nails in order to secure sheet rock to frame members.

Another improvement would be to have tape measure with a writing means built into it at the set distance or a scoring means built into the tape measure at those predetermined distances so that once the tape measure was extended along the wall the entire tape measure could be pushed against the wall and slid up and down to leave the markings at the appropriate locations.

One tape measure could be used for both the 16 and 19 inch measurements. Another improvement would be to have one set of tape measure holes at a low height and the other set of holes at a high height along the tape measure or conversely to have the holes have different shapes and/or different color charting to allow one set of markings to be distinguished from another.

Figures 7, 8:
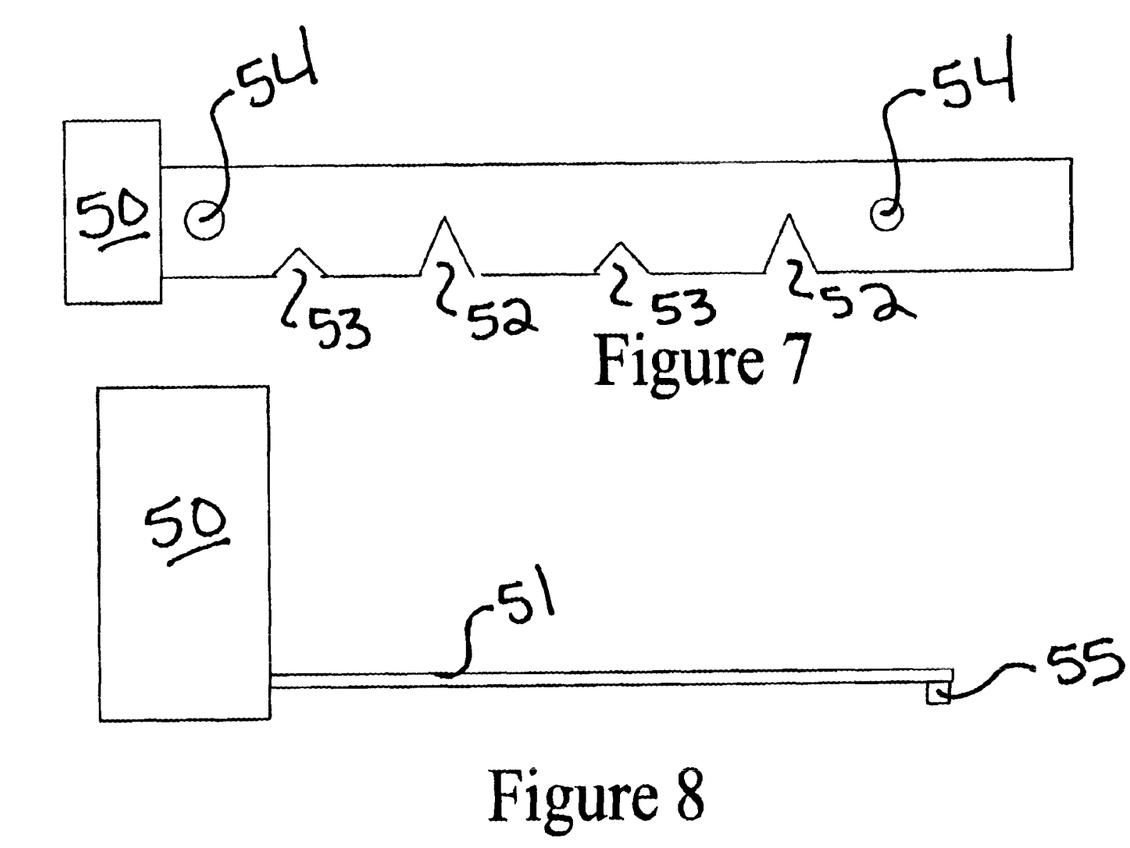
FIG. 7 shows the tape measure described herein.
FIG. 8 shows a cross section of the tape measure shown in FIG. 7.

The measuring tape comprises a tape case 50 having a tape 51 which has sides or edges which may define large grooves 52 and small grooves 53. In addition it may define openings 54 which here are shown as round but may be of any shape as long as they are large enough to have a pencil put in for marking.

In addition there is a locking clip 55 which is found on all modem measuring tapes. The large grooves 52 may mark large measurements, the small grooves 53 may mark intermediary measurements, and the round opening may measure either the large or small graduations which are desired for this product in conjunction with the general description given above.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A tool box for use with a vehicle, said vehicle having a bed, said bed having a length and a width, said tool box for use with a ladder, said ladder having rungs and said vehicle bed having a left side wall having a top and a right side wall having a top and a back wall having a top and said vehicle bed having a tailgate, said tool box comprising:

(1) a top plate having a length and a wall end and an extended end, the top plate being rotatably attached to the top of the back wall at the wall end, said top plate further having a width at least approximately equal to the width of the bed;

(2) a front plate running between the left side wall and the right side wall having a bed end and a raised end, the front plate being rotatably attached by at least one pivot at the bed end to the bed at a given location between the tailgate and the back wall; and (3) a joining means for connecting the raised end to the extended end defining a space capable of receiving the ladder between the bed and the bed end and wherein the front plate is pivotally connected above the bed so that the front plate may be pivoted upright to join with the top plate and wherein the front plate further comprises an extension plate attached to the bed end for fitting between the rungs of the ladder when the front plate is pivoted to join with the top plate so that the ladder may be securely held.

2. The tool box of claim 1 further comprising a bin rack having a bin, the bin rack being disposed between the back wall and the extension plate so that the bin is held shut when the front plate is upright.

3. A tool box for use with a vehicle, said vehicle having a bed, said bed having a length and a width, said tool box for use with a ladder, said ladder having rungs and said vehicle bed having a left side wall having a top and a right side wall having a top and a back wall having a top and said vehicle bed having a tailgate, said tool box comprising:

(1) a top plate having a length and a wall end and an extended end, the top plate being rotatably attached to the top of the back wall at the wall end, said top plate further having a left side and a right side and a width less than the width of the bed; and further comprising a first overhang fitting over the left side wall attachable to the left side of the top plate and a second overhang fitting over the right side wall attachable to the right side of the top plate;

(2) a front plate running between the left side wall and the right side wall having a bed end and a raised end, the front plate being rotatably attached by a swivel at the bed end between the tailgate and the back wall; and (3) a joining means for connecting the raised end to the extended end.

4. The tool box of claim 3 wherein the tool box further comprises a tool box floor having a left and a right side and wherein the tool box floor left side is attached to the left side wall and the tool box floor right side is attached to the right side wall above the bed.

5. The tool box of claim 4 further comprising at least one bin removably insertable into the tool box and at least one wire rack for holding the at least one bin.

6. The tool box of claim 3 wherein the first attachment means and second attachment means are hinges.

* * * * *